United States Patent
Sheehan et al.

(10) Patent No.: US 12,242,532 B2
(45) Date of Patent: Mar. 4, 2025

(54) PROCESSES AND SYSTEMS FOR MIXING AUDIO TRACKS ACCORDING TO A TEMPLATE

(71) Applicant: Aries Adaptive Media, LLC, Charlotte, NC (US)

(72) Inventors: Nicholas Sheehan, Fort Mill, SC (US); Colleen Sheehan, Fort Mill, SC (US); Michael Munger, Woodstock, GA (US); Chase Morgan, Concord, NC (US)

(73) Assignee: Aries Adaptive Media, LLC, Charlotte, NC (US)

( * ) Notice: Subject to any disclaimer, the term of this patent is extended or adjusted under 35 U.S.C. 154(b) by 420 days.

(21) Appl. No.: 17/219,417

(22) Filed: Mar. 31, 2021

(65) Prior Publication Data
US 2021/0303618 A1    Sep. 30, 2021

Related U.S. Application Data

(60) Provisional application No. 63/003,178, filed on Mar. 31, 2020.

(51) Int. Cl.
*G06F 16/63* (2019.01)
*G06F 3/16* (2006.01)
*G06F 16/638* (2019.01)

(52) U.S. Cl.
CPC ............ *G06F 16/639* (2019.01); *G06F 3/165* (2013.01); *G10H 2210/036* (2013.01);
(Continued)

(58) Field of Classification Search
CPC . G06F 16/639; G06F 3/165; G10H 2210/036; G10H 2210/076;
(Continued)

(56) References Cited

U.S. PATENT DOCUMENTS 8,865,993 B2 * 10/2014 Vorobyev ............. G10H 1/0008
84/616
9,880,805 B1 * 1/2018 Guralnick ............. G06F 3/0482
(Continued)

FOREIGN PATENT DOCUMENTS

WO    WO-2013179743 A1 * 12/2013 ....... G06F 17/30772

OTHER PUBLICATIONS

International Patent Application No. PCT/US2021/25210; Int'l Search Report and the Written Opinion; dated Jun. 9, 2021; 8 pages.

*Primary Examiner* — Hicham Skhoun
(74) *Attorney, Agent, or Firm* — Blank Rome LLP

(57) ABSTRACT

A computerized process, a system, and non-transitory computer-readable medium having computer-executable instructions for mixing audio tracks according to a template. The process may include receiving at least one request for each of a plurality of time blocks of a template; querying a catalog of songs and/or song portions in a database to compile a candidate list of songs and/or song portions that substantially meet the at least one request of a first time block of the plurality of time blocks; choosing a first song portion and a second song portion from the candidate list for the first time block; compiling the first song portion and the second song portion to form at least a portion of the first time block, including blending a temporal length of the first song portion and the second song portion; and generating an audio file with the plurality of time blocks.

20 Claims, 7 Drawing Sheets

(52) U.S. Cl.
CPC . *G10H 2210/076* (2013.01); *G10H 2210/325* (2013.01); *G10H 2210/391* (2013.01); *G10H 2240/141* (2013.01); *G10H 2240/325* (2013.01)

(58) Field of Classification Search
CPC ....... G10H 2210/325; G10H 2210/391; G10H 2240/141; G10H 2240/325
USPC .......................................................... 707/725
See application file for complete search history.

(56) References Cited

U.S. PATENT DOCUMENTS

| | | | | |
|---|---|---|---|---|
| 10,236,006 | B1* | 3/2019 | Gurijala | G10L 19/02 |
| 11,604,824 | B2* | 3/2023 | Rahman | G06F 3/165 |
| 2005/0211072 | A1* | 9/2005 | Lu | G10H 1/40 |
| | | | | 84/612 |
| 2006/0000344 | A1* | 1/2006 | Basu | G10H 1/0025 |
| | | | | 84/612 |
| 2007/0074617 | A1* | 4/2007 | Vergo | G06F 16/639 |
| | | | | 707/E17.101 |
| 2008/0072741 | A1* | 3/2008 | Ellis | G10H 1/40 |
| | | | | 84/609 |
| 2009/0019995 | A1* | 1/2009 | Miyajima | G10H 1/0025 |
| | | | | 84/625 |
| 2009/0177301 | A1* | 7/2009 | Hayes | G11B 19/025 |
| | | | | 707/999.005 |
| 2011/0003638 | A1* | 1/2011 | Lee | G10H 1/368 |
| | | | | 463/43 |
| 2011/0246508 | A1* | 10/2011 | Maekawa | G06F 16/40 |
| | | | | 707/769 |
| 2013/0205223 | A1* | 8/2013 | Gilbert | G06Q 30/0269 |
| | | | | 715/748 |
| 2014/0355789 | A1* | 12/2014 | Bohrarper | H04N 21/44016 |
| | | | | 381/119 |
| 2015/0378667 | A1* | 12/2015 | Ridihalgh | A63F 13/54 |
| | | | | 715/716 |
| 2016/0103652 | A1* | 4/2016 | Kuniansky | H04L 63/123 |
| | | | | 700/94 |
| 2016/0283192 | A1* | 9/2016 | Friesen | G06F 3/04817 |
| 2017/0041730 | A1* | 2/2017 | Seligmann | H04R 27/00 |
| 2017/0115956 | A1* | 4/2017 | Zalon | G11B 27/036 |
| 2017/0236504 | A1* | 8/2017 | Brooker | G06Q 50/184 |
| | | | | 84/609 |
| 2017/0256271 | A1* | 9/2017 | Lyon | G06F 21/10 |
| 2017/0330540 | A1* | 11/2017 | Quattro | G06F 16/683 |
| 2018/0192108 | A1* | 7/2018 | Lyons | G06F 16/219 |
| 2019/0236209 | A1* | 8/2019 | Bencar | G06F 16/639 |
| 2019/0258448 | A1* | 8/2019 | Mollis | G06F 16/4393 |
| 2020/0073625 | A1* | 3/2020 | Zalon | G10L 25/48 |
| 2021/0201863 | A1* | 7/2021 | Bosch Vicente | G10H 1/36 |
| 2021/0279030 | A1* | 9/2021 | Morsy | G10H 1/0091 |
| 2021/0294840 | A1* | 9/2021 | Lee | G06N 3/084 |
| 2021/0335332 | A1* | 10/2021 | Tsutaki | G10H 1/125 |

* cited by examiner

TEMPLATE

Every 00:30 minutes for 01:00 minutes

210' → Every [ 00:30 ] minutes

220' → for [ 01:00 ] minutes(2x)

230' → at [ 2 ⌄ ] Energy Level

Every 02:30 minutes for 07:30 minutes

240' → Every [ 02:30 ] minutes

250' → for [ 07:30 ] minutes(3x)

260' → at [ 2 ⌄ ] Energy Level

270' → Add/Remove sets (optional)

Want countdown beeps?

NO

[ BACK ]              [ CLOSE ] [ SUBMIT ]

PROCESSES AND SYSTEMS FOR MIXING AUDIO TRACKS ACCORDING TO A TEMPLATE

PRIORITY

This application claims the benefit of priority of U.S. Provisional Patent Application No. 63/003,178, filed Mar. 31, 2020, the disclosure of which is expressly incorporated herein in its entirety.

TECHNICAL FIELD

Embodiments disclosed herein are generally directed to audio processing. More particularly, the embodiments relate to processes, systems, and graphical user interfaces for generating a template and/or playlist for user input, and then generating an audio track based on the template using music which fit the structure and template definitions.

BACKGROUND

Gyms and fitness professionals often use audio to accompany workouts and exercises for classes and individual training. Currently, there is no way to mix tracks together to create a suitable mood for the exercises. Fitness professionals are only able to use full songs in their entirety during classes and workouts. While this is somewhat suitable for its purpose, it does not provide the optimal experience for the participants who would benefit from the moods created by different types of audio with differing activity and tones.

SUMMARY

Thus, the present inventors realize that it is highly desirable to allow fitness professionals to design workouts in concert with a musical routine that will match the energy, mood, and/or tempo of the exercise and rest periods so that when a participant is asked to sprint, high energy audio is played, and when they are asked to rest, more soothing audio is played.

One aspect of the present disclosure is directed to embodiments of a computerized process, a system, and non-transitory computer-readable medium having computer-executable instructions configured to perform a process of: receiving at least one request for each of a plurality of time blocks of a template; querying a catalog of songs and/or song portions in a database to compile a candidate list of songs and/or song portions that substantially meet the at least one request of a first time block of the plurality of time blocks; choosing a first song portion and a second song portion from the candidate list for the first time block; compiling the first song portion and the second song portion to form at least a portion of the first time block, including blending a temporal length of the first song portion and the second song portion; and generating an audio file with the plurality of time blocks.

In some embodiments, the at least one request includes a value calculated based on at least one of a tempo, an audio power, a time signature, an intensity level, and a genre. In some embodiments, the value is calculated by a weighted summation of two or more of the tempo, the audio power, the time signature, the intensity level, and the genre. In some embodiments, the temporal length of the blending is based on a tempo of the second song portion. In some embodiments, the second song portion is an incoming song portion. In some embodiments, the temporal length is determined based on a reference table of tempo ranges. In some embodiments, the process further comprises querying the catalog of songs and/or song portions in the database to compile a second candidate list of songs and/or song portions that substantially meet at least one request of a second time block of the plurality of time blocks; choosing a third song portion and a fourth song portion from the candidate list for the first time block; blending a temporal length of the third song portion and the fourth song portion; and compiling the third song portion and the fourth song portion to form at least a portion of the second time block. In some embodiments, the process further comprises extracting the first song portion from a first song with a start time of the first song portion being inversely proportional to a tempo of a first song; and extracting the second song portion from a second song with a start time of the second song portion being inversely proportional to a tempo of a second song. In some embodiments, the process further comprises adjusting a pitch of the second song portion to match key with the first song portion. In some embodiments, the process further comprises adjusting a tempo of the second song portion to match a tempo of the first song portion for the temporal length. In some embodiments, the process further comprises adding a looping, a stuttering, and a scratching feature to the temporal length. In some embodiments, the process further comprises sending to a display a graphical user interface with a playlist including the first song portion and the second song portion before generating the audio file. In some embodiments, the process further comprises resetting the first and second portions of the playlist based on user input before generating the audio file. In some embodiments, the process further comprises removing the first and/or second song portion from the playlist based on user input before generating the audio file. In some embodiments, the process further comprises audibly previewing the first song portion and the second song portion to a user before generating the audio file. In some embodiments, the process further comprises checking a usage history of the first song portion and the second song portion; and removing the first song portion or the second song portion for violating licensing terms or restrictions. In some embodiments, the process further comprises appending metadata of the first song portion and the second song portion to the audio file. In some embodiments, the process further comprises sending to a display an indicator of a tempo or energy score of the audio file over a temporal scale.

BRIEF DESCRIPTION OF THE DRAWINGS

In order that the various embodiments may be readily understood, aspects are illustrated by way of examples in the accompanying drawings.

DETAILED DESCRIPTION

Figure 1:
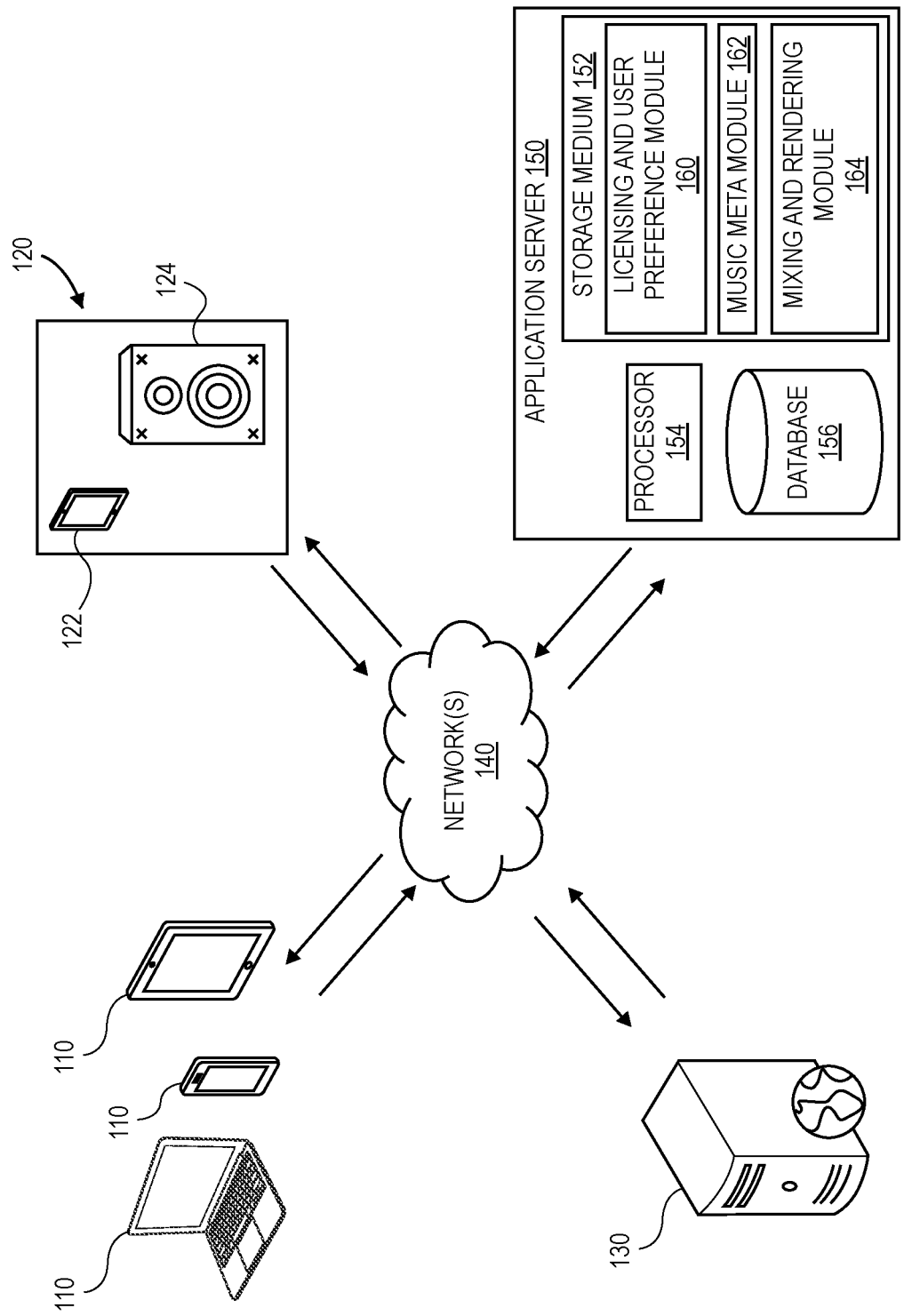
FIG. 1 illustrates an exemplary distributed computer system according to embodiments of the disclosure.

The embodiments disclosed herein include new, efficient ways to create an audio mix according to a specified format and time structure. One aspect of the invention is directed to a graphical user interface (GUI), which allows a client (e.g., a gym owner or workout instructor) to create a template by which musical tracks are selected and incorporated into an audio mix. The client may create and design a musical template and structure that will dictate what the resulting audio playlist will contain in terms of musical genre, tempo (beat), mood, and/or energy, which may be altered/accepted to generate a desired audio mix. The templates may include one or more periods or time blocks of activity with varying lengths, and have an associated set of characteristics required for the music of that time block. The templates may be stored on a database of an application server and be used by the application server to create playlists and audio mixes, which substantially conform to the specifications in the template.

The application server may read the template, and for each period in the template, select songs and/or song portions from a catalog in a database, which conform to the specified energy score, tempo, mood, genre, audio power, and/or related metadata. It is desirable to include songs and/or song portions in the rendered audio mix with a consistent energy, tempo and/or pitch to ensure that the audio of each of the workout segments is consistent. Thus, each of the songs and/or song portions may be pre-processed to extract the tempo, pitch, and/or energy score of the songs and/or song portions. For example, the system may calculate an energy score according to a tempo, an audio power, a time signature, a loudness or intensity level (decibels), and/or a genre of the song. If the energy score of the song in its entirety is high or low relative to a range (e.g., above an upper threshold or below a lower threshold), the system may determine that the song is consistently at that level because the song is not averaged down to the mean to a substantial degree. However, if the energy score is determined to be in the middle of a range (e.g., below an upper threshold and/or above a lower threshold), the system may determine a possible presence of a substantial change (drop or rise) in volume and/or beat. Thus, the system may further parse the songs and/or song portions accordingly to identify any substantial change (drop or rise) in volume and/or beat, that would be undesirable for the rendered audio mix. The system may then treat each of the portions of the sample songs having consistent volume and/or beats separately.

In some embodiments, the system may display the playlist of music to a user/client in a GUI prior to rendering the finalized audio mix. The playlist may include one or more lists of songs and/or song portions that substantially conform to one or more time blocks of the template. The playlist may allow the client to reset, shuffle, rearrange, and/or remove songs and/or song portions from the playlist to conform to the client's preferences. The GUI may also have a media player configured to generate an audible preview of the songs and/or song portions upon user input to facilitate the client in curating the audio mix and ensuring that the audio mix is acceptable for its intended purposes. Once the client decides that the playlist is acceptable, the application server ray receive confirmation through user input into the GUI, which may instruct the application server to proceed with generating the audio mix.

However, in some embodiments, the system may automatically render the audio file containing the audio mix from the template without additional feedback from the playlist.

In generating the playlist and/or audio mix, the application server may extract portions of songs with a start time of the song portion being inversely proportional to a tempo of a first song, and the length of the song portion may be capped (e.g., 2 minutes) from the calculated start time. The audio mix may be generated by the application server choosing a first song from the catalog for each time block that dictates a master clock defining a tempo for that time block. The application server may then modify the tempo of each of the other songs in the time block to substantially match the tempo of the master clock to provide consistent energy throughout the time block. Thus, the application server may produce an audio mix with a plurality of time blocks with different energy levels, tempos, and/or pitch that facilitates a workout of multiple segments of different activity (e.g., warming-up, cardio, endurance, sprinting, weight-training, and cooling down). Furthermore, the temporal length of adjacent song portions may be blended together to provide smooth transitions and a consistent energy throughout each segment of activity. The temporal length of the blending may be based on a reference table of tempo ranges of the incoming (later) song in the transition to provide a smooth transition.

The application server may check the songs against use and licensing requirements. The application server may also include or exclude media/songs based on user/client preferences. The application server may further generate feedback to the client based on data indicating preferences of participants of a scheduled workout.

FIG. 1 illustrates an exemplary system 100 according to the embodiment of the invention. The system 100 may include one or more participant devices 110, a client system 120, network server 130, and an application server 150, communicating over one or more networks 140.

The participant devices 110 may include but not limited to mobile devices, tablets, desktop computers, laptop style computers, and/or smart watches. The participant devices 110 may include displays connected to workout equipment, such as bicycles, elliptical equipment, rowing machines ("erg machines"), and/or interactive mirrors. The participant devices 110 may have a display outputting a GUI sent from the application server 150 and receives inputs and/or display information related to audio mixes and/or music preferences of participants. The participant devices 110 may additionally include one or more of a touchscreen, keyboard, and mouse. The participant devices 110 may be used by participants to sign up for scheduled workout classes and receive participant data, through the GUI. For example, the GUI of the participant devices 110 may receive music preferences of the participants, such as preferred songs, artists, and/or genres which can be compiled to generate class data for scheduled events, such as workout classes. The participant devices 110 may also display audio mixes to the participants to be played by the participants, for example, if the participant misses a scheduled workout. The participant devices 110 may further display audio mixes to the participants for feedback or input on the selected music prior to a scheduled work. For example, the audio mixes may be crowdsourced by allowing the participants to vote up or down the generated audio mix or portions thereof prior to a scheduled workout through the participant devices 110.

A client system 120 may include client devices 122 and/or one or more audio outputs 124. The client devices 122 may include but not limited to mobile devices, tablets, desktop computers, laptop style computers, and/or smart watches. The client devices 122 may have a display outputting a GUI sent from the application server 150 and receives inputs and/or outputs information related to audio mixes to participants. For example, the client devices 122 may display the GUT 200, 200' of FIG. 2 or 3 in order to receive input to receive input for the template and/or playlist in order to render the audio mix and display outputs based on participant data. The client devices 122 may additionally include one or more of a touchscreen, keyboard, and mouse. The one or more audio outputs 124 may include speakers configured to emit the audio of the audio mix. The audio outputs 124 may be associated with a workout establishment, such as gyms, cross-fit studios, spin studios, yoga studios, and/or exercise classes.

The application server 150 may include a storage medium 152, a processor 154, one or more databases 156, one or more network interface cards or other network communication interfaces, and/or volatile random access memory storage. The application server 150 may have a display outputting a GUI that receives inputs and/or outputs information related to audio mixes. The application server 150 may additionally include one or more of a touchscreen, keyboard, and mouse.

The storage medium 152 may include non-transitory computer readable medium on which computer readable instructions may be encoded for performing an analysis of the audio data. The computer readable medium may be coupled to the processor 154, which executes the stored instructions in order to implement the functionality disclosed herein. For example, the storage medium 152 may store one or more programs, modules, data structures, and/or a subset or superset thereof including an operating system that includes procedures for handling various basic system services and for performing hardware dependent tasks. The computer readable medium may include a communication module used for connecting server to other computers (e.g., websites) via one or more communication interfaces (wired or wireless), which in turn connect the backend server to one or more communications networks such as the Internet, other wide area networks, local area networks, metropolitan area networks, and so on.

For example, the storage medium 152 may include a licensing and user preference module 160, a metadata module 162, and a mix and rendering module 164.

The licensing and user preference module 160 may include instructions to check the usage history of audio data from the database 156, and remove data that may possibly violate licensing terms or restrictions, for example, by referring to third party databases. The licensing and user preference module 160 may also cross-check audio data with data indicating preferences of the client and/or participants to remove songs that are disliked by the client and/or participants.

The metadata module 162 may include instructions to process audio data from the database 156. For example, the metadata module 162 may be configured to generate metadata by parsing source songs or song portions into portions defined by seconds, bars and/or other sampled sizes, based on the runtime or length of the source songs or song portions, to generate metadata. The metadata module 162 may further include instructions to analyze a structure, pitch or volume, tempo or beat, genre, artist, title, and other attributes of the source songs or song portions. Thus, in some embodiments, the parsing of the source songs or song portions may be based on determining a substantial change of pitch or volume during the runtime of the song by comparison to a threshold, as further discussed herein. The metadata module 162 may further calculate an intensity or energy score (or value) of the source songs or song portions based on the analyzed aspects of the songs, as further discussed herein. The metadata module 162 may save the metadata of the source songs or song portions into a catalog that may be later accessed to generate the audio mix from the source songs or song portions.

The mix and rendering module 164 may include instructions to modify, blend, mix, and render sampled audio files in accordance with the defined templates and metadata, as discussed herein. The mix and rendering module 164 may be configured to modify the tempo and/or pitch of songs and/or song portions to provide a consistent energy level in a time block. The mix and rendering module 164 may also blend a temporal length of adjacent songs and/or song portions to provide smooth transitions in each of the time blocks. The temporal length may be based on a reference table of tempo ranges of the incoming (later in time) song in the transition to provide a smooth transition. For example, a first lower range of tempos has a first longer transition length, a second intermediate range of tempos has a second intermediate transition length, a third higher range of tempos has a third shorter transition length. In other words, the tempo ranges may be generally inversely proportional to the length of transition (the slower the range of tempos, the longer the transition).

The processor 154 may include a programmable central processing unit (CPU) which may be implemented by any known technology, such as a processor, a microprocessor, a microcontroller, an application-specific integrated circuit (ASIC), a digital signal processor (DSP), or the like. The CPU may be integrated into an electrical circuit, such as a conventional circuit board, that supplies power to the CPU. The CPU may include internal memory or external memory coupled thereto. The memory may be coupled to the CPU by an internal bus. The memory may include random access memory (RAM) and read-only memory (ROM). The memory may contain instructions and data that control the operation of the CPU. The memory may also include a basic input/output system (BIOS), which contains the basic routines that help transfer information between elements within the system.

The one or more databases 156 may include audio data, such as the catalog of songs and/or song portions that can be sampled by the processor 154 for the processes of the present disclosure. The database 156 may further include metadata from the songs of the catalog generated by the metadata module 162, such as structure, tempo, genre, artist, mood or energy score and other attributes of the songs of the catalog. The metadata of the catalog may additionally include the location and accessibility of the source songs or song portions of the catalog. The database 156 may further include schedule and participant data for one or more workout establishments. For example, the database 156 may include time and locations of workout classes, including associated clients (e.g., gyms and/or scheduled instructors) and/or participants. The database 156 may include the nature of the workout classes and time of day. The database 156 may further include music preferences, workout history, and mood for the clients and/or participants.

Figure 2:
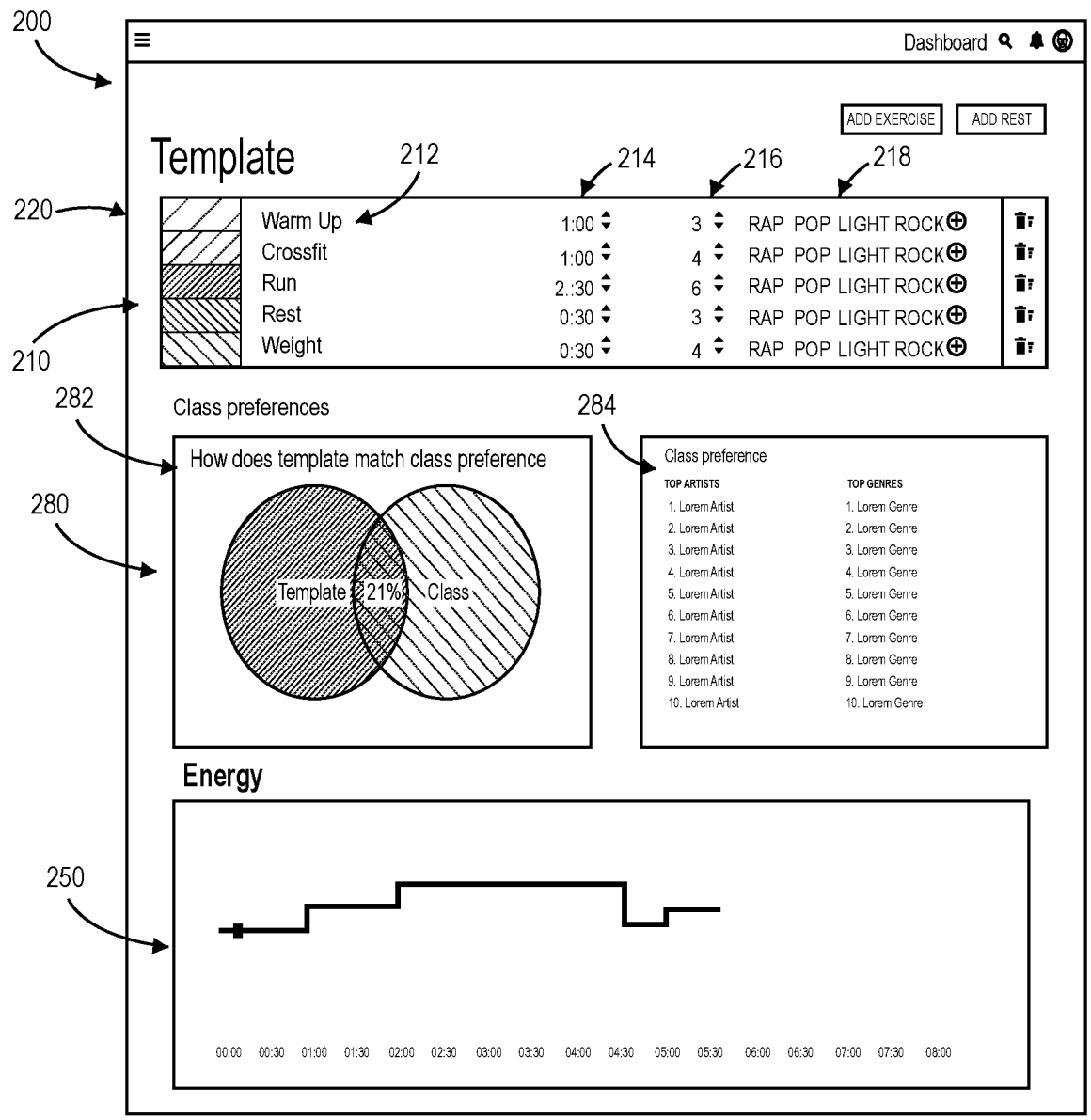
FIG. 2 illustrates a first exemplary graphical user interface for generating a template according to embodiments of the disclosure.

FIG. 2 illustrates a first exemplary graphical user interface (GUI) 200 according to embodiments of the invention. The GUI 200 may be sent from the application server 150 and displayed on the client device 122 and/or devices associated with the application server 150. The GUI 200 may include a number of data fields, including a template input interface 210, an energy score display 250, and a participant preference interface 280. The application server 150 may receive the inputs into the GUI 200.

The template input interface 210 may display a template having a plurality of time blocks with fields for the client to input various requests. The template input interface 210 may include one or more workout segment fields 212, time interval fields 214, tempo or energy fields 216, and genre fields 218. Each of the fields 212-218 may define aspects of a segment of a workout. The inputs of the fields 212-218 may serve as requests or criteria receiving by the application server 150 for generating the playlists and/or audio mix as discussed herein. The fields 212-218 may be configured to receive preset values, such as that selectable in a drop-down menu.

For example, the workout segment fields 212 may receive an input from the client indicating an activity intended to occur during a particular workout segment. The value of the workout segment fields 212 may be based on an intensity of a single activity. The workout segments fields 212 may be provided in a list indicating the temporal layout, template or order of segments of a workout, such that the client may customize a desired template of music for a workout. For example, during a spin workout, the segments may include a warm-up segment, a sprint segment of various degrees, a steady segment, a rest segment, and/or a cool down segment. The activity may, additionally or alternatively, indicate a different type of activity, such as cross-fit segment, a run segment, a bike segment, a row segment, an elliptical segment, and a weight segment. Each of the workout segments may have an indicator 220 (e.g., color and/or pattern coding) indicating the type of activity of the workout segment. Thus, each of the workout segments 212 (e.g., five illustrated in FIG. 2) may establish a period or time block for music mixed together with a continuous tempo or energy.

The time interval fields 214 may receive an input from the client for a time duration for each of the workout segments. The time interval fields 214 may dictate the duration of music for the activity of the corresponding workout segment field 212. For example, in some embodiments, the time duration may vary from 10 seconds to 30 minutes, in preset intervals of 5 seconds.

The energy fields 216 may receive an input from the client for a desired energy, tempo, pitch, and/or mood for each of the workout segments. The energy fields 216 may dictate the energy of music for the activity of the corresponding workout segment field 212. In some embodiments, the energy fields 216 may be based on an intensity or energy score that is more easily understood by the client. For example, the energy score may be a numerical value (e.g., ranging on an integer scale from 1-5 or 1-10) calculated based on the tempo, pitch, genre, artist, and/or other attributes of the song or song portion. For example, an energy score of 1 out of 5 may provide low energy suitable for rest and/or stretching, and an energy score of 5 out of 5 may provide high energy suitable for high intensity workouts, such as sprinting. Thus, higher energy scores may indicate to the client that the song has more energy (e.g., faster tempo and/or higher pitch). The energy score may allow the client to customize the workout more clearly, especially when the client is not familiar with more traditional units of measurement, such as decibels or beats per minute (bpm). The energy score may also provide a more encompassing indication of the energy of music. For example, a faster tempo but quieter pitch may provide lower energy to a listener than other songs having a similar or slower tempo with higher pitches. Furthermore, certain genres of music have musical features that provide more energy than other genres of music. Thus, the energy score may be determined based on a weighted summation of a number of factors, including one or more or all of tempo, genre, pitch, audio power, loudness or intensity level, time signature, and beats per measure (or bar), where the weight of each of the factors is based on formulation. The audio power may be determined based on one or more or all of the amplitude of the audio signal, a channel size of the audio (.wav) file, and a frame rate of the audio (.wav) file. Additional factors may include frequency and/or root mean square (RMS) of the audio signal. A reference table may assign a value to different inputs or ranges of the factors (e.g., tempo ranges and genres). A weight may be applied to each of the factors/values and summed to generate the energy score.

The genre fields 218 may receive an input from the client for a genre for each of the workout segments. The genre fields 218 may dictate the genre of music for the activity of the corresponding workout segment field 212. For example, the genre fields 218 may receive inputs of one or more of rap, hip-hop, pop, light rock, hard rock, heavy metal, electric dance music (FDM), classic rock, reggae, dancehall reggae, new age, Latin pop, R&B, and techno. The genre fields 218 may, additionally or alternatively, include inputs of a requested mood or feeling, such as chill, low energy, high energy, and loud.

In some embodiments, one or more of the fields 212-218 may auto-populate based on the input of the activity, such as the workout segment field 212. For example, if the client inputs a warm-up segment into the workout segment field 212, the GUI 200 may automatically populate suitable inputs into the corresponding time interval field 214-218. For example, the GUI 200 may input the time, energy, and genre suitable for the warm-up segment of the workout, but also allowing adjustment by the client. In a similar sense, in some embodiments, one or more of the fields 212-218 may be left blank by the client. However, the fields 214-218 may additionally or alternatively be only manually adjustable by the client.

As exemplarily illustrated in FIG. 2, the client may generate a music template of a first time block of a warm up activity for 60 seconds of energy score of 3, a second time block of a cross-fit activity for 90 seconds of an energy score of 4, a third time block of a run activity for 170 seconds of music of an energy score of 6, a fourth time block of a rest of 30 seconds of an energy score of 3, and a fifth time block of a weight segment for 30 seconds of an energy score of 4. As discussed herein, the use of an energy score (e.g., factoring in tempo and pitch) may generate a more consistent determination of energy for the activity of the time block. The application server 150 may receive the input from each of the fields 212-218 and generate a playlist and/or a resultant audio mix accordingly.

The energy score display 250 may provide a visual representation of the change in energy score or tempo over the time of the template as the template is filled out. The energy score display 250 may allow the client to visualize the relative intensity of the workout, for example, as a linear plot over time. The energy score display 250 may auto-populate based on the inputs of the energy field 216. However, the GUI 200 may, additionally or alternatively, allow the client to modify the template by interacting with the energy score display 250. For example, if the client modifies the graphical display of the energy score display 250 by dragging a temporal segment of the line down, the energy field 216 of the corresponding activity may be decreased accordingly. An indicator point or vertical line on the linear plot may advance temporally as the workout progresses to indicate or highlight to the user/client the energy that participants should be expending at that particular point of time during the workout. The visual representation of the energy score display 250 may, additionally or alternatively, include pie charts, color indicators, and/or a heat map symbolizing the desired energy of the workout.

The participant preference interface 280 may provide information to the client on preferences of participants of a scheduled exercise class, such as a comparison display 282 and a class preference display 284. The application server 150 may access participant data inputted by participants of a gym or a scheduled class through a participant GUI. The application server 150 may also compile the participant data of scheduled participants to generate class data including preferences of all of the scheduled participants. The application server 150 may also compare the class data to inputs of the fields 212-218 and/or the resultant audio mix. The participant preference interface 280 may thus allow the client to adjust the inputs of the template input interface 210 based on the preferences of the participants to improve participant satisfaction of the resultant audio mix.

The comparison display 282 may display a comparison of the resultant playlist or audio mix with participant preferences. For example, the comparison display 282 may include a Venn diagram providing an overlap of songs selected in the resultant audio mix and songs indicated to be preferences by participant data of a scheduled exercise class. The overlap may be indicated by an average percentage of songs in the resultant audio mix that are indicated to be preferred by each of the scheduled participants. As illustrated in FIG. 2, the comparison display 282 indicates that 21% percent of the songs in the audio mix are, on average, found in the preferences of participants of the scheduled exercise class. The comparison display 282 may be updated in real time as the template is filled out by the client for easy reference and/or as preference data is updated at participant GUIs.

The class preference display 284 may provide lists of most popular songs, artists, and genres according to preferences of a scheduled exercise class. The class preference display 284 may also provide an easy reference to the client as the template is filled out.

Figure 3:
FIG. 3 illustrates a second exemplary graphical user interface for generating a template according to embodiments of the disclosure.
Figure 3:

FIG. 3 illustrates a second exemplary GUI 200' of generating a template according to embodiments of the disclosure. The GUI 200' may be sent from the application server 150 and displayed on the client device 122 and/or devices associated with the application server 150. The application server 150 may receive the inputs into the GUI 200'. The GUI 200' may function similar to the GUI 200, as discussed above and incorporated herein with reference to the GUI 200' unless otherwise indicated.

The GUI 200' may be designed to generate time blocks for interval training at different energy levels. The GUI 200' may include a number of data fields, including for a first interval: a first interval time field 210', a first set duration time field 220', and a first energy level field 230', and for a second interval: a second interval time field 240', a second set duration time field 250', and a second energy level field 260'. Thus, as illustrated in FIG. 3, the GUI may receive a request for music at an energy level of 3 for a first set of two intervals of 30 seconds each, for a total of 1 minute, and music at an energy level of 2 for music at an energy level of 2 for a second set of three intervals of 2.5 minutes each, for a total of 7.5 minutes. The GUI 200' may allow the client/user to add or remove additional intervals with button inputs 270'. The GUI 200' may also allow the client/user to add countdown beeps with a slider input 280' indicating the end of an interval or workout.

The application server 150 may receive the request through the GUI and access the catalog of music to generate a playlist of music at the desired energy levels with rest in between the intervals. The rest may be in the of silence or slower music.

The application server 150 may receive the inputs of the templates produced by the GUIs 200, 200'. In some embodiments, the application server 150 may render an audio mix directly from the templates, as discussed with reference to FIG. 7. However, in some embodiments, the application server 150 may produce a playlist in an interface to allow the client/user to modify the music in a GUT prior to rendering the audio mix, as discussed below.

Figure 4:
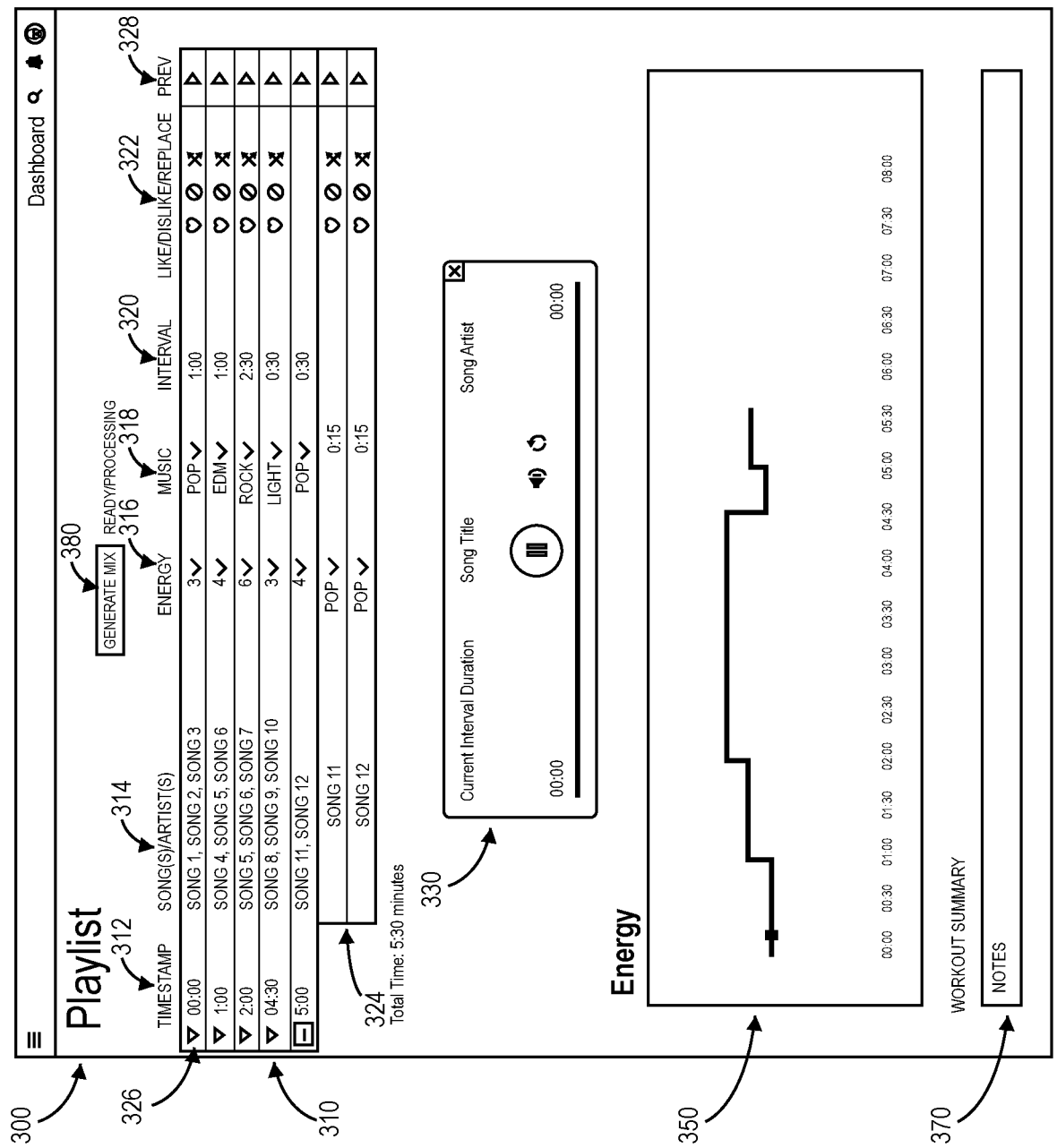
FIG. 4 illustrates an exemplary graphical user interface for displaying a playlist for curating an audio mix according to embodiments of the disclosure.

FIG. 4 illustrates an exemplary GUI 300 for displaying a playlist and allowing a user/client to curate an audio mix according to embodiments of the disclosure. The GUI 300 may be sent from the application server 150 and displayed on the client device 122 and/or devices associated with the application server 150. The GUI 300 may be displayed in response to inputs from GUI 200, 200'. The GUI 300 may include a number of fields including a playlist interface 310, a preview media player 330, and an energy score display 350. The application server 150 may receive the inputs into the GUI 300.

The application server 150 may access the catalog of songs and song portions and populate the playlist interface 310 with music according to a template generated from the GUIs 200, 200'. The playlist interface 310 may display the playlist having a plurality of time blocks with fields that the user/client may manipulate. The playlist interface 310 may include a time stamp field 312, a song(s) and artist(s) field 314, an energy level field 316, a genre field 318, an interval field 320, and an action field 322.

The song(s) and artist(s) field 312 displays the title and artist of the songs that the application server 150 selected for the time blocks requested based on the inputs from the GUIs 200, 200'. The song(s) and artist(s) field 314 may list all of the songs chosen for the given time block, and allow for a dropdown menu 324 accessible with an icon 326 to view/modify the songs individually.

The time stamp field 312 may indicate the start time for each of the time blocks, and the interval field 320 may indicate the time duration for each of the time blocks. The energy level field 316 may indicate the energy level for the time block. The genre field 318 may indicate the genre of the time block. Each of the fields 310-320 may be adjustable to allow the user/client to modify the playlist and the resultant audio mix. For example, the user/client can modify the energy level field 316 and/or the genre field 318, and the application server 150 may automatically access the catalog and populate the song(s) and artist(s) field 312 with new songs according to the updated fields 310-320.

The action fields 322 may also allow the user/client to modify the playlist and resultant audio mix by liking, disliking, and/or shuffling the entire time block or the songs individually. For example, if a user/client indicates liking the time block or song (e.g., by clicking on the heart icon as illustrated), the application server 150 may update the catalog accordingly with a note of user preferences. Similarly, if the user/client indicates disliking the time block or song (e.g., by clicking on the crossed-out circle as illustrated), the application server 150 may remove the time block or song from the playlist and update the catalog accordingly. The user/client may also shuffle (e.g., by clicking on the crossing arrows as illustrated), where the application server 150 replaces the songs of the time block with songs of the same criteria.

The playlist interface 310 may also allow the user/client to audibly preview the time blocks or songs individually with an icon 328, which opens up the preview media player 330. The preview media player 330 allows the client/user to audibly play the song portions of the time block and/or songs individually, prior to the audio being mixed and/or rendered. The preview media player 330 may be a sample or non-persistent media player, such that the audio stops playing when the window of the GUI 300 is not open and/or being interacted with. Thus, once the window is closed and/or another window is opened, the preview media player 330 may stop playing music.

The GUI 300 may include the energy score display 350, which may correspond with the energy score display 250 of GUI 200, such that the discussion is incorporated herein with reference for sake of brevity. The GUI 300 may include a workout summary field 370 that may include text and/or pictorial notes from the client/user.

The GUI 300 may further a confirmation input 380, that allows the user/client to accept the playlist and indicate to the application server 150 to proceed with rendering the audio mix based on the accepted playlist.

Figure 5:
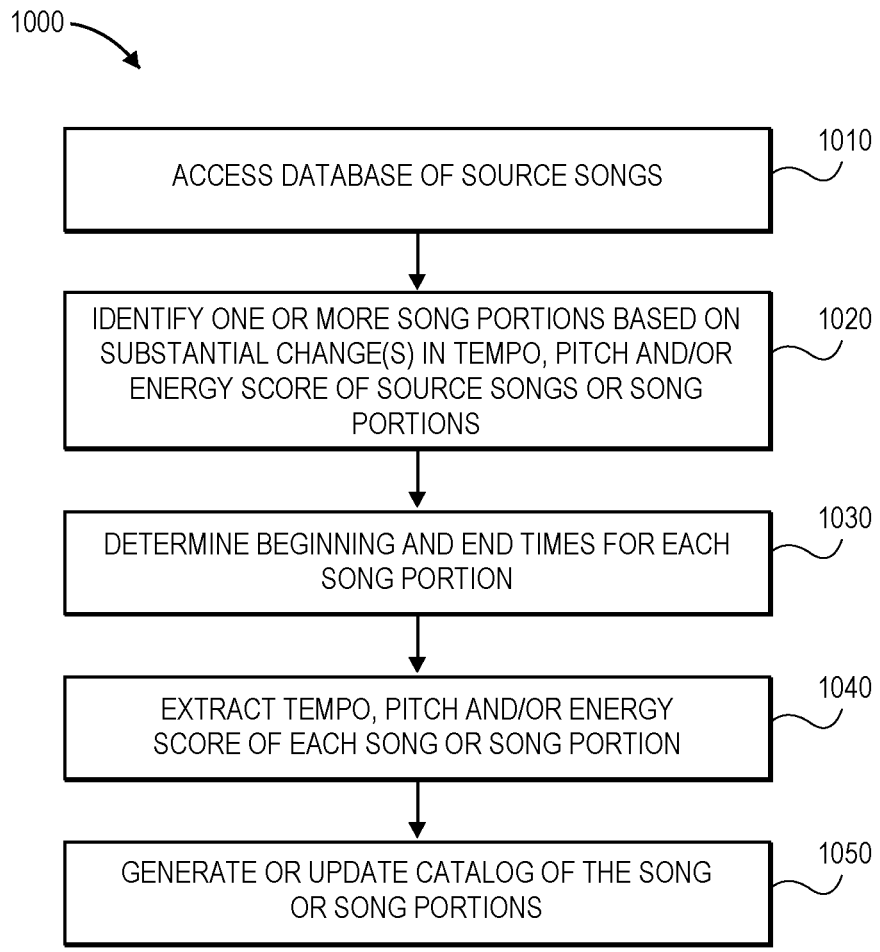
FIG. 5 illustrates a block flow diagram depicting a computerized process of pre-processing audio data according to embodiments of the disclosure.

FIG. 5 illustrates a block flow diagram depicting a computerized process 1000 of generating metadata for a catalog of songs. The catalog may include metadata of entire songs and/or song portions of source songs, as discussed herein. Once processed, the catalog may allow the application server 150 to access portions of the source songs based on the runtime of the song (e.g., time from the beginning of the song) to extract and process the song portion to generate the audio mix.

At step 1010, the application server 150 may access the database of source songs. The database of songs may be saved in the database 156, streamed through the Internet from subscription services such as Amazon Prime Music, and/or directly uploaded by licensed music producers. The catalog may reduce processing time and storage space by saving and relying on metadata to access source songs, for example, saved on a third party server. Thus, once processed, the application server 150 does need to save a modified song locally.

At step 1020, the application server 150 may identify the structure of one or more source songs (or song portions) and extract corresponding song portion(s) and/or bar segments having a consistent energy score, tempo, and/or volume. The application server 150 may query the songs of the database to determine variations of energy scores in the songs. The variation of energy scores may be determined based on change in volume and/or pitch of the song. For example, the presence of a substantial change (drop or rise) in volume and/or beat, the application server 150 may determine a song transition. The length of the song portion may be determined based on the length of the song where the volume maintains substantially the same percentage of the original volume. For example, the application server 150 may mark a first song portion when a song plays at a first volume for two minutes. The application server 150 may then mark a song transition if the volume drops from a level of 80 dbs to 50 dbs transitioning for a length of two bars (e.g., 1-1.5 seconds). The application server 150 may then mark a second song portion for a minute and a half length of the song with a reduced volume. The application server 150 may then mark a second transition when the song increases volume, which may be followed by a third portion when the song substantially maintains the increased volume of the first song portion. The source songs may have any number of song portions based on the volume/energy level. Each song portion may be treated distinctly because of the variation of the energy score and/or tempo that would be provided to the audio mix of the present disclosure. Additionally or alternatively, song portions with similar energy score, tempo, and/or volume may be treated collectively to provide a desired energy level. However, in some embodiments, the song portions may be extracted in 2 minute blocks with a start time inversely proportional to the tempo of the song portion.

In some embodiment, step 1020 may be contingent on a threshold of the energy score of a source song (or song portion) as a whole. For example, if the application server 150 determines that the entirety of a source song (or song portion) has a high energy score (e.g., 8 out of a scale of 10), the application server 150 may determine that the song over the entire length has high energy due to the law of averages. In other words, the song does not have a low energy portion of the song weighing down the energy score as a whole. Thus, the application server 150 may apply the determined energy score to the source song (or song portion) without further parsing. On the other hand, if the source song (or song portion) has a mid-ranged energy score (e.g., 5 out of a scale of 10), the application server 150 may determine that the source song (or song portion) has a higher likelihood of substantial change (drop or rise) in volume and/or beat. In other words, the application server 150 may determine that the energy score is averaging to the middle. The application server 150 may continue to parse the source song (or song portion) determine any substantial changes (drop or rise) in volume and/or beat, in order to separately treat each song portion with a consistent energy score as discussed herein.

The application server 150 may, additionally or alternatively, process one or more of the songs by determining the bars of music that correspond to each portion of the song, for example corresponding to the intro, the verse, the hook, the chorus, the bridge, and/or the outro. The application server 150 may determine that the chorus is 8 bars long, and save the bar segments in the catalog as metadata appended to the corresponding song.

At step 1030, the application server 150 may determine the temporal structure of the one or more songs of the catalog. For example, the application server 150 may determine the beginning and end times for each portion of the one or more songs. The application server 150 may determine the temporal location of the chorus, and note the "start" and "stop" of the chorus in terms ofh:m:s.iii, where 'h' is hours, 'm' is minutes, 's' seconds, and 'iii' is the microseconds based on the beginning of the song. Thus, the application server may determine that the chorus start might be "in" at 0h1 m15.234s and "out" at 0h1m20.234s. Similarly, the application server may determine the temporal location of each of the song portion(s) and/or bar segments having a consistent energy score, tempo, and/or volume and corresponding transitions. The application server 150 may save the temporal structure as metadata in the catalog in the database 156 associated with the song.

At step 1040, the application server 150 may extract the tempo, pitch, and/or energy score for each portion of the one or more songs, as discussed herein.

At step 1050, the application server 150 may continuously or intermittently update the catalog, such as the application server 150 ray update the songs by appending metadata and/or remove songs due to licensing issues, as discussed herein.

Figure 6:
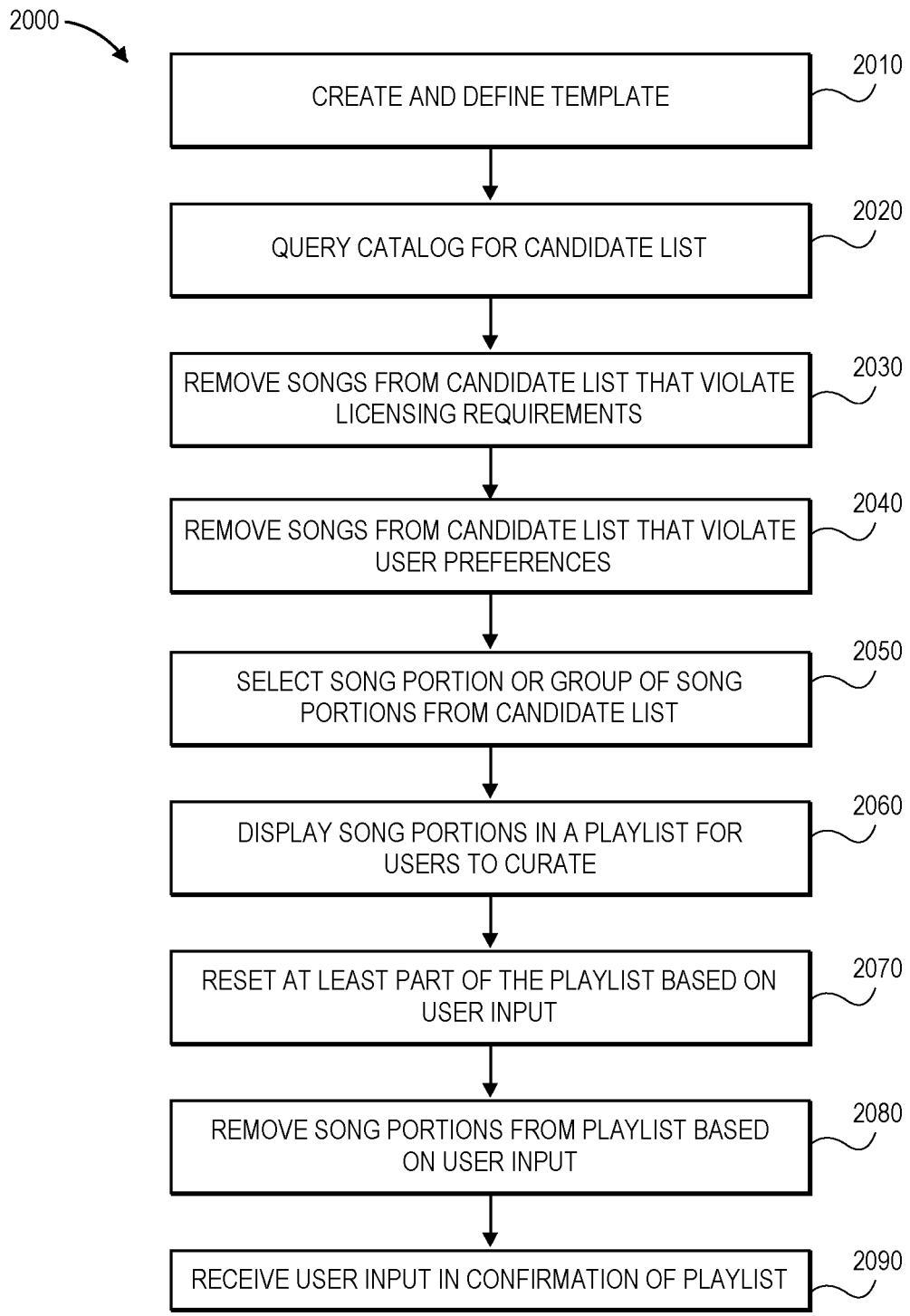
FIG. 6 illustrates a block flow diagram depicting a computerized process of constructing a playlist for an audio mix based on the user defined template according to embodiments of the disclosure.
Figure 7:
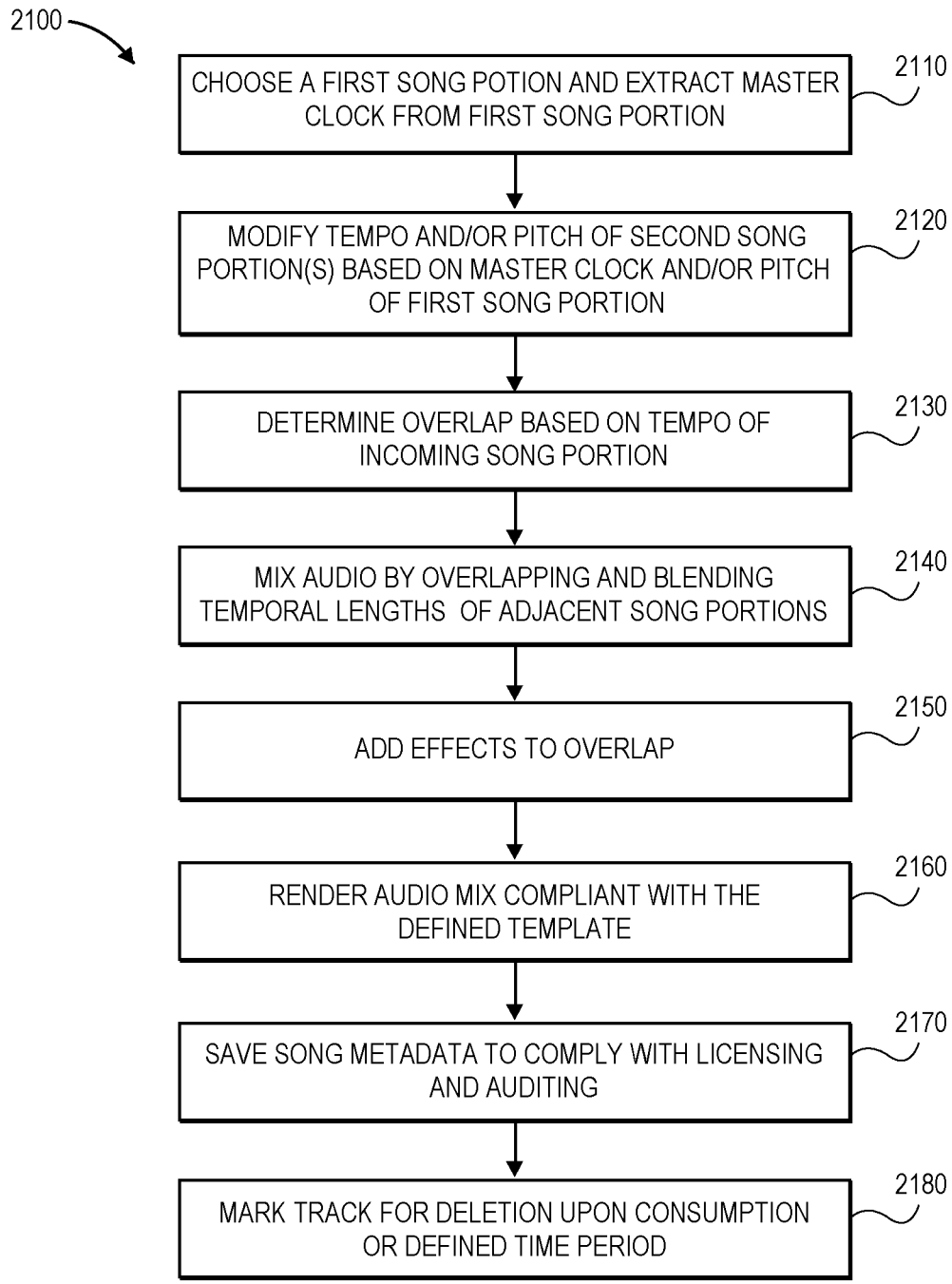
FIG. 7 illustrates a block flow diagram depicting a computerized process of generating the audio mix.

FIGS. 6-7 illustrate block flow diagrams depicting computerized process(es) 2000, 2100 for constructing an audio mix based on the user defined template and/or user-modifiable playlist.

At step 2010, a client may create and define a template that may be saved in the database 156 of the application server 150. As illustrated at the GUI interfaces of FIGS. 2 and 3, the client may define a template with multiple discrete periods of musical characteristics. The template may include at least one request or criteria, including at least one of an energy score, a tempo, and a genre. Once completed, the client submits the template for processing. The series of periods with associated time and musical metadata for that period and associated metadata may be saved in the database 156. Steps 2020-2180 may be performed or repeated for each of the established periods or time blocks.

At step 2020, the application server 150 may query the database 156 to populate a candidate list of song portions which meet the at least one request or criteria for each of the time blocks. Thus, due to the different requests or criteria for each time block, a first time block may be selected from a first candidate list, a second time block may be selected from a second candidate list, a third time block may selected from a third candidate list, and so on. The application server 150 may randomly choose song portions which fit the at least one request. The application server 150 may query the database 156 for song portions that meet the defined metadata from the catalog of available songs upon save or at a future time as allotted by the system. The application server 150 may broaden the requested criteria of the GUI 200, for example, as a basis for a range. The application server may take the requested tempo of energy field 216 and apply +/−1 range of the requested energy score. Broadening the requested range may allow a larger and more diverse group of songs for the criteria. If metadata already exists for that title, artist, and track, the application server 150 may query the catalog of metadata and parse the songs according to the previously parsed metadata. If the song metadata does not exist, the application server 150 may parse and analyze the song at this time to determine all relevant song metadata including energy score, tempo, artist, album, track, and publisher. Thus, for each of the periods, the application server 150 may return a resultant set of songs that may be used based on substantial conformation of the at least one request submitted for that segment of the template. Step 2020 may be performed for each time block.

At step 2030, the application server 150 may check the usage history of those songs, and remove any that may possibly violate any licensing terms or restrictions from the result set. For each song chosen at random, the system may query the licensing requirements, playback history, performance history, and any other licensing requirements to determine if the use of that song in this mix for this customer and for performance with that customer would violate any licensing agreements. Any songs, which may violate licensing requirements may be removed from the candidate list, and a replacement song may be queried from the database.

At step 2040, the application server 150 may remove songs from the candidate list that violate any user preferences. For example, the application server 150 may access client data indicating songs previously "disliked" by the client/user and remove the corresponding song from the candidate list.

At step 2050, the application server 150 may select song portion or group of song portions from the candidate list. The song portion or group of song portions may be chosen randomly from the candidate list of songs that meet the at least one criteria of the time block from the template. The selected song portions may then be compiled into a playlist.

At step 2060, the application server 150 may send a playlist of song portions to a display for the user to curate the audio mix. The playlist may be displayed in the GUI 300 for the user to modify based on personal preferences and/or audibly preview each the song portions prior to mixing. The user/client often desires to provide input by modifying the playlist, prior to the rendering the audio mix due to for example lack of familiarity of the songs.

Thus, at step 2070, the application server 150 may shuffle or reset at least part of the playlist based on user input. Thus, the GUI 300 may allow the client/user by manipulation of the fields of the GUI 300 to replace all of the songs in a time block or the entire playlist with new songs, based on user input on the GUT 300. For example, the user may change the genre of the music in a time block by manipulating the genre field 318, thus replacing the songs of a time block with songs of a different genre. The user may also shuffle the songs of the time block (e.g., by clicking on the crossing arrows in the action field 322), where the application server 150 replaces the songs of the time block with songs of the same criteria.

At step 2080, the application server 150 may remove one or more song portions from the playlist based on user input. For example, the user may remove the time block or song (e.g., by clicking on the crossed-out circle of the action field 322), the application server 150 may remove the time block or song from the playlist and update the catalog accordingly. For example, the application server 150 may indicate in the database that the time block or song is disliked by the user/client, so the time block or song will no longer populate a playlist of the user. On the other hand, if the user indicates liking the time block or song (e.g., by clicking on the heart icon of the action field 322), the application server 150 may update the catalog accordingly with a note of user preferences. Thus, the application server 150 may be more likely to populate the liked time block or song after being indicated as liked.

At step 2090, the application server 150 may receive user input for confirmation of the playlist to generate the audio mix. For example, the user may click on the confirmation input 380, that allows the user/client to accept the playlist and indicate to the application server 150 to proceed with rendering the audio mix based on the accepted playlist.

At step 2110, the application server 150 may select a primary song portion or a group of song portions from each group for each of the target period. The selection may be performed randomly. If a group of songs is chosen, the application server 150 may choose a primary song from the group having a median beat. The chosen song may be analyzed to determine the tempo, which is then set as a master clock. The application server 150 may parse each song for each period and template looking for song portions and/or series of bars, which best fit the defined duration for that interval. This step may be repeated until all candidate audio files have been processed. In some embodiments, the application server 150 may extract the portions of songs from the catalog, with a start time of the song portion being inversely proportional to a tempo of a first song, and the length of the song portion may be capped (e.g., 2 minutes)

from the calculated start time. The extraction proportional to the tempo has been found to be effective to capture the chorus of the song that are desirable for providing the workout energy, while avoiding the unpredictable and less desirable lead in portion of the song.

At step 2120, the application server 150 may resample song portions of the candidate list to conform the audio beats per minute to the master clock. The application server 150 may compare the difference between the master clock to the tempo of each sample to determine if the adjustment is necessary. For example, if the master clock is determined to be 120 bpm based on a first song portion chosen as the primary song and a second song portion has a 122 bpm, the second song portion may not be adjusted because the difference in tempo would be insubstantial. However, if the master clock is determined to be 120 bpm based on sample A chosen as the primary song, a third song portion having a 130 bpm may be slowed down to 120 bpm. The inventors recognize that it is very unlikely that a 10% change in the tempo of a piece of music (either up or down) would create a noticeable bad outcome, and so if the template requires 120 bpm, and a candidate song that is 130 bpm is chosen, which is then dropped to 120, the outcome would be pleasant. The application server 150 may also adjust the pitch of the candidate songs in order to compensate for the change in tempo.

At step 2130, the application server 150 may determine the temporal length of the blending or overlap (transition) based on a tempo of the second song portion. The temporal length may be based on the later or incoming song portion of the blending, where the temporal length can be determined through a reference table according to tempo ranges of the incoming song portion. The temporal length of the blending or overlap may be inversely proportion to a tempo range, such that faster music may have a shorter overlap. For example, a first incoming song falling in a first range of tempos (e.g., 1-60 BPM) may have an overlap of 8 seconds. A second incoming song falling in a second range of tempos (e.g., 60-120) may have an overlap of 4 seconds. A third incoming song falling in a third range of tempos (e.g., 120-200) may have an overlap of 2 seconds. The correspondence between the overlap and tempo of the incoming song may provide a smooth transition and energy flow to the listeners.

At step 2140, the application server 150 may mix the songs together at intervals for the period using the corresponding temporal length of the reference table of step 2130, For example, the first 4 seconds of the incoming song portion may be blended with the last 4 seconds of the outgoing song portion. However, in other embodiments, the temporal length of the blending may be based on the musical bars, which may or may not perfectly coincide with the defined template. For example, the first 4 bars of the incoming song portion may be blended with the last 4 bars of the outgoing song portion. Where the difference in tempo between two tracks is different, the tempos may be adjusted in smaller increments than 4 bars. The system may determine to adjust the tempo by a given number of beats per minute per bar, or even as granularly as per a given number of frames of audio for that track. In any case, this blending process may be repeated in a chained order until all the song portions are blended into a final resultant track. In some embodiments, the tempo of the blended portion of one of the song portions may be modified to match the other blended song portion. Matching the tempo of the blended portion may provide a synchronized sound effect, but the modified song may then be sped up or slowed down to reach the original tempo of the song portion. Thus, the application server 150 may modify a tempo of only a portion of the respective song portion, while keeping another portion of the song portion with the original tempo. The application server 150 may further modify a bridging portion of the song portion to provide a smooth transition between the matched tempo and original tempo. In some embodiments, the pitch of at least one of the overlapping songs can be modified to match key for the overlapping songs.

At step 2150, the application server 150 may add effects to the blending or overlap. The effects may include overlaying the transition of the first and second song portions with a sound effect and/or modifying at least one of the incoming and outgoing song portions to provide an impression of a deejay. The effects may include one or more of a looping, a stuttering, and a scratching. The looping may include extracting a portion of one of the incoming and outgoing song portions and repeating the extracted portion. The stuttering may be similar to looping, where looping may include extracting a longer segment (e.g., a number of bars), while stuttering extracts a shorter length of the song portion. The scratching may include either modifying or overlaying one of the at least one of the first and second song portions to provide the effect of a deejay scratching a record.

At step 2160, the application server 150 may render the audio mix significantly compliant with the defined template. The final track may be rendered to the file system and encoded as an MP3, Free Lossless Audio Codec (FLAC), WEBM, OPUS or any other audio format. The final mix metadata, which may include artist, duration, album, publisher, and any other relevant licensing information required by the publisher may be stored in the database 156 as well as the full and final web accessible universal resource locator for that file itself. The application server 150 may then notify the client that the audio mix is ready. The client and/or participant may then consume the audio mix via the participant system 110 and/or client device 120. The audio mix may be played on a persistent media player such that the media player stays open and/or the audio mix continues to play, as the user browses other windows in the application, browses other applications on the participant system 110 and/or client device 120, and/or the participant system 110 and/or client device 120 goes into a sleep or idol mode.

At step 2170, the application server 150 may save the song label, artist, album, and other song metadata to the database 156 to comply with licensing requirements and auditing. The application server 150 may save the resultant songs, render time, and other file metadata to the server for licensing compliance.

At step 2180, the application server 150 may optionally mark the audio mix for deletion upon either its completion or the end of a defined time period. Once either of these conditions are met, the application server 150 may remove the file from the file system by overwriting the file with random data, truncating the file to zero bytes, and finally deleting the file. Information regarding the processing of the file, the shredding of the ile, deletion, reason for deletion, and other relevant information may be stored in order to produce and comply with audit processes. However, in some embodiments, the application server 150 may save the template, playlist, and/or audio mix for later use by the user. The system 100 may also allow the saved template, playlist, and/or audio mix be shared between clients (e.g., workout instructors) or played at different classes at a gym.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computerized process comprising:
receiving, from a user, a first request for a first time block and a second request for a second time block of a template, wherein the first request includes a first energy score, the second request includes a second energy score, and the first energy score and the second energy score are based on a weighted summation based on two or more of a tempo, an audio power, a time signature, a loudness, a pitch, an intensity level, beats per a measure, a frequency, a root mean square (RMS) of an audio signal, and a genre;
querying a catalog of songs and/or song portions in a database to compile a first candidate list of songs and/or song portions that substantially meet the first request of the first time block;
choosing a first song portion and a second song portion from the songs and/or song portions of the first candidate list for the first time block;
compiling the first song portion and the second song portion to form at least a portion of the first time block;
querying the catalog of songs and/or song portions in the database to compile a second candidate list of songs and/or song portions that substantially meet the second request of the second time block;
choosing a third song portion and a fourth song portion from the songs and/or song portions of the second candidate list for the second time block;
compiling the third song portion and the fourth song portion to form at least a portion of the second time block; and
generating an audio file with the first time block and the second time block.

2. The process of claim 1, further comprising
extracting the first song portion from a first song with a start time of the first song portion being inversely proportional to a tempo of the first song; and
extracting the second song portion from a second song with a start time of the second song portion being inversely proportional to a tempo of the second song.

3. The process of claim 1, further comprising adjusting a pitch of the second song portion to match key with the first song portion.

4. The process of claim 1, wherein compiling the first song portion and the second song portion includes blending a temporal length of the first song portion and the second song portion.

5. The process of claim 4, further comprising adding one or more of a looping, a stuttering, and a scratching feature to the temporal length.

6. The process of claim 1, further comprising sending to a display a graphical user interface with a playlist including the first song portion and the second song portion before generating the audio file.

7. The process of claim 6, further comprising resetting the first song portion and the second song portion of the playlist based on user input before generating the audio file.

8. The process of claim 6, further comprising removing the first song portion and/or the second song portion from the playlist based on user input before generating the audio file.

9. The process of claim 6, further comprising audibly previewing the first song portion and the second song portion to the user before generating the audio file.

10. The process of claim 1, further comprising:
checking a usage history of the first song portion and the second song portion; and
removing the first song portion or the second song portion for violating licensing terms or restrictions.

11. The process of claim 1, further comprising appending metadata of the first song portion and the second song portion to the audio file.

12. The process of claim 1, further comprising sending to a display an indicator of a tempo or energy score of the audio file over a temporal scale.

13. The process of claim 4, further comprising adjusting a tempo of the second song portion to match a tempo of the first song portion for the temporal length.

14. The process of claim 13, wherein the temporal length of the blending is based on a tempo of the second song portion.

15. The process of claim 14, wherein the second song portion is an incoming song portion.

16. The process of claim 14, wherein the temporal length is determined based on a reference table of tempo ranges.

17. The process of claim 1, wherein the first energy score and the second energy score are different.

18. The process of claim 1, wherein each of the first energy score and the second energy score is a numerical value.

19. A system, comprising:
at least one processor; and
at least one memory storing instructions that, when executed, cause the at least one processor to perform a perform of:
receiving, from a user, a first request for a first time block and a second request for a second time block of a template, wherein the first request includes a first energy score, the second request includes a second energy score, and the first energy score and the second energy score are based on a a weighted summation based on two or more of a tempo, an audio power, a time signature, a loudness, a pitch, an intensity level, beats per a measure, a frequency, a root mean square (RMS) of an audio signal, and a genre;
querying a catalog of songs and/or song portions in a database to compile a first candidate list of songs and/or song portions that substantially meet the first request of the first time block;
choosing a first song portion and a second song portion from the songs and/or song portions of the first candidate list for the first time block;
compiling the first song portion and the second song portion to form at least a portion of the first time block,
querying the catalog of songs and/or song portions in the database to compile a second candidate list of songs and/or song portions that substantially meet the second request of the second time block;
choosing a third song portion and a fourth song portion from the songs and/or song portions of the second candidate list for the second time block;

compiling the third song portion and the fourth song portion to form at least a portion of the second time block; and generating an audio file with the first time block and the second time block.

20. A non-transitory computer-readable medium comprising computer-executable instructions which, when executed by at least one processor, cause the at least one processor to perform a process of:

receiving, from a user, a first request for a first time block and a second request for a second time block of a template, wherein the first at request includes a first energy score, the second request includes a second energy score, the first energy score and the second energy score are based on a weighted summation based on two or more of a tempo, an audio power, a time signature, a loudness, a pitch, an intensity level, beats per a measure, a frequency, a root mean square (RMS) of an audio signal, and a genre;

querying a catalog of songs and/or song portions in a database to compile a first candidate list of songs and/or song portions that substantially meet the first request of the first time block;

choosing a first song portion and a second song portion from the songs and/or song portions of the first candidate list for the first time block;

compiling the first song portion and the second song portion to form at least a portion of the first time block;

querying the catalog of songs and/or song portions in the database to compile a second candidate list of songs and/or song portions that substantially meet the second request of the second time block;

choosing a third song portion and a fourth song portion from the songs and/or song portions of the second candidate list for the second time block;

compiling the third song portion and the fourth song portion to form at least a portion of the second time block; and generating an audio file with the first time block and the second time block.

* * * * *